Nov. 25, 1958   H. R. GORDON   2,862,096
ELECTRIC OVENS
Filed June 30, 1955   7 Sheets-Sheet 1
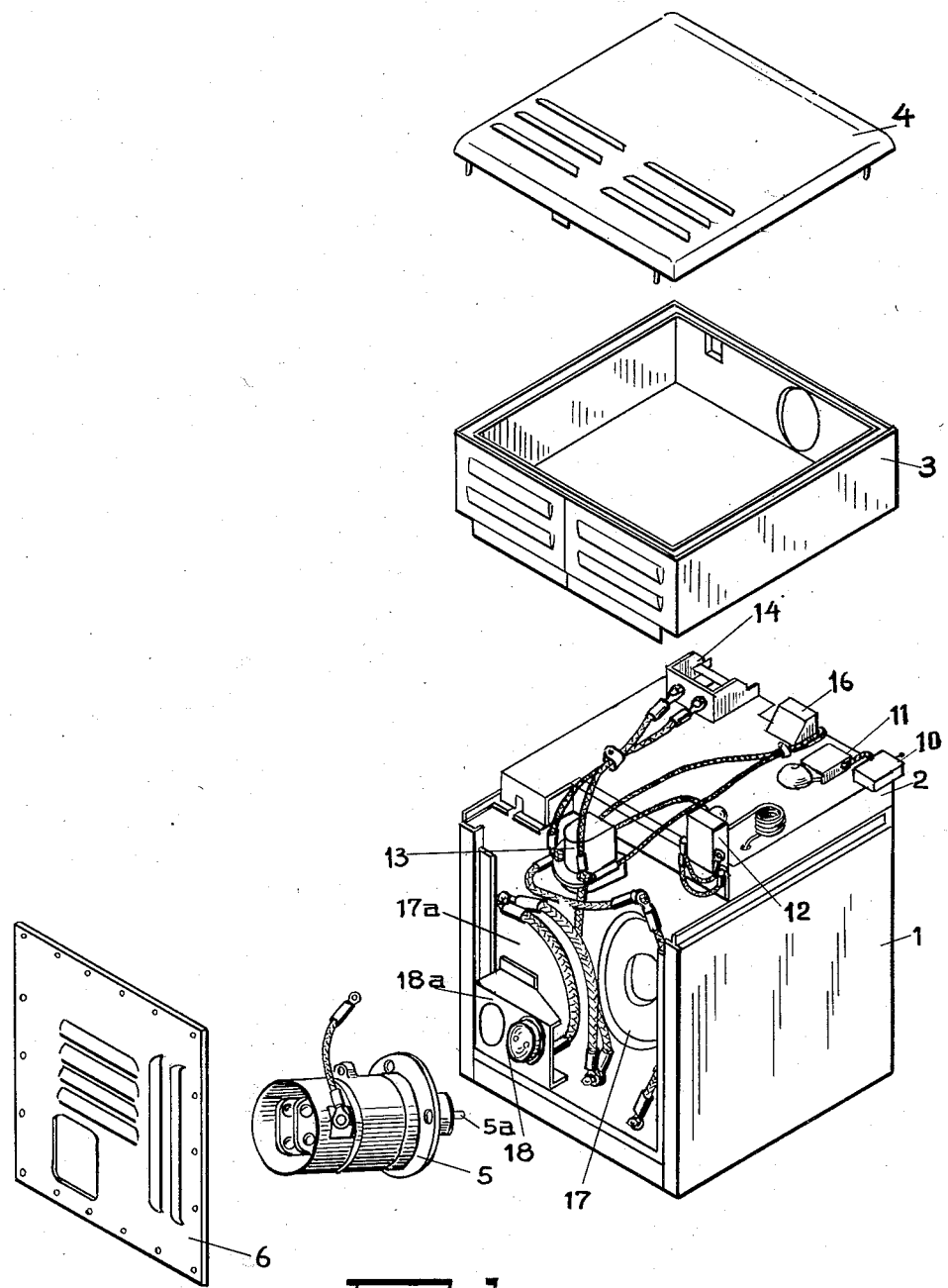
Fig-1-
INVENTOR.
HENRY ROBERT GORDON
BY
ATTORNEY

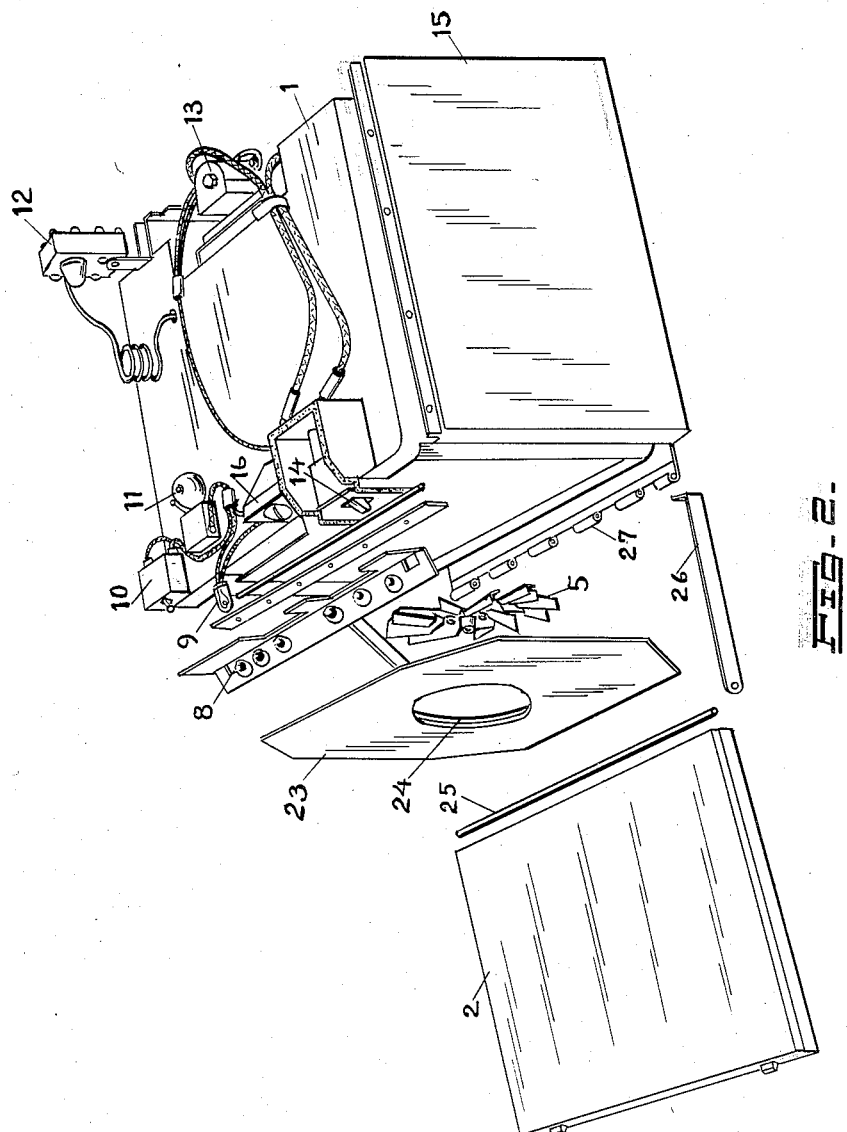

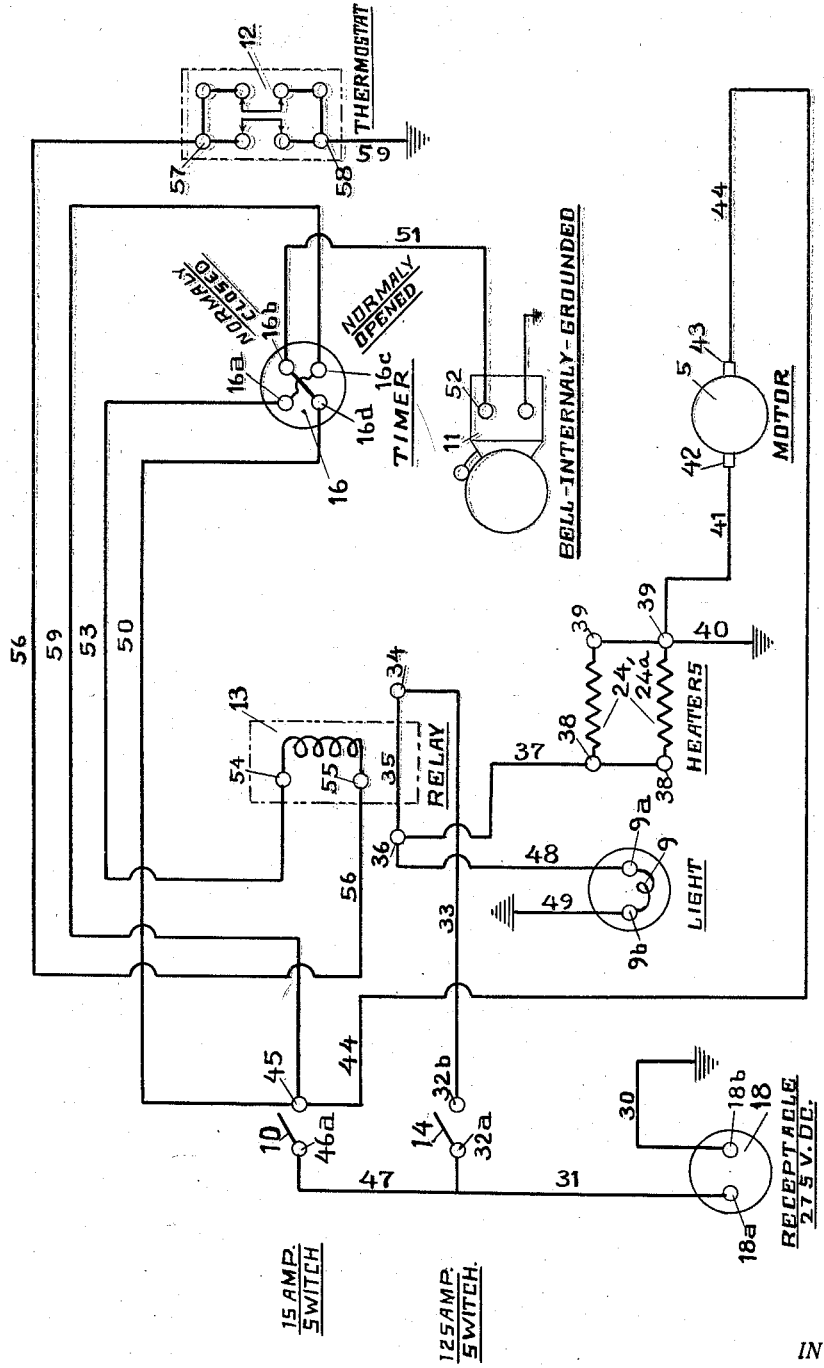

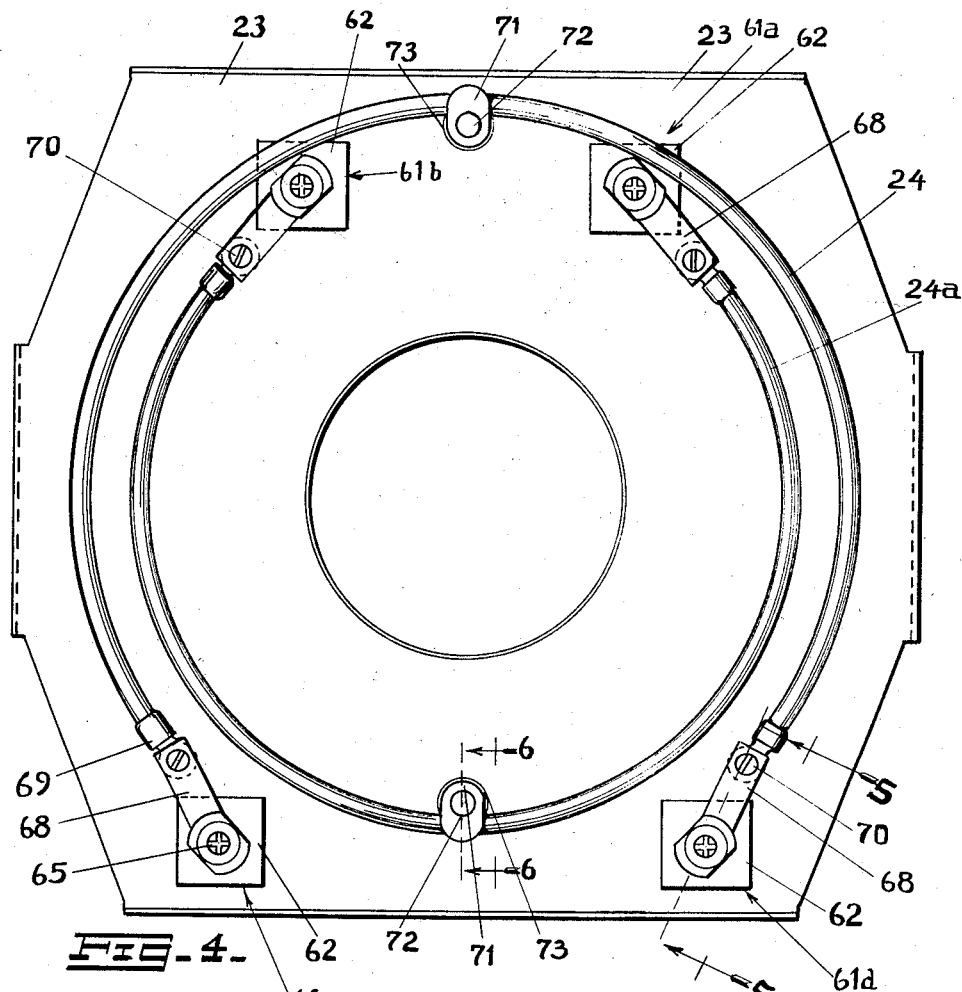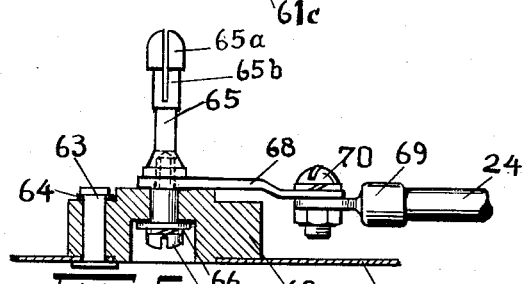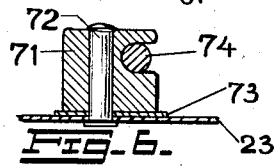

Nov. 25, 1958  H. R. GORDON  2,862,096
ELECTRIC OVENS

Filed June 30, 1955  7 Sheets-Sheet 5

INVENTOR.
HENRY ROBERT GORDON
BY
ATTORNEY.

Nov. 25, 1958  H. R. GORDON  2,862,096
ELECTRIC OVENS
Filed June 30, 1955  7 Sheets-Sheet 6
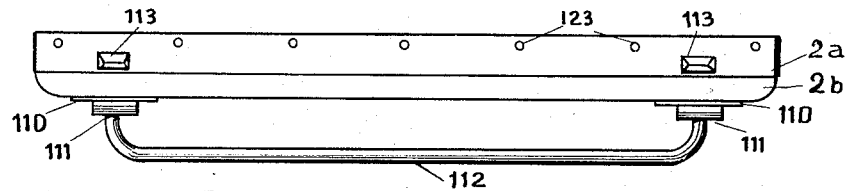
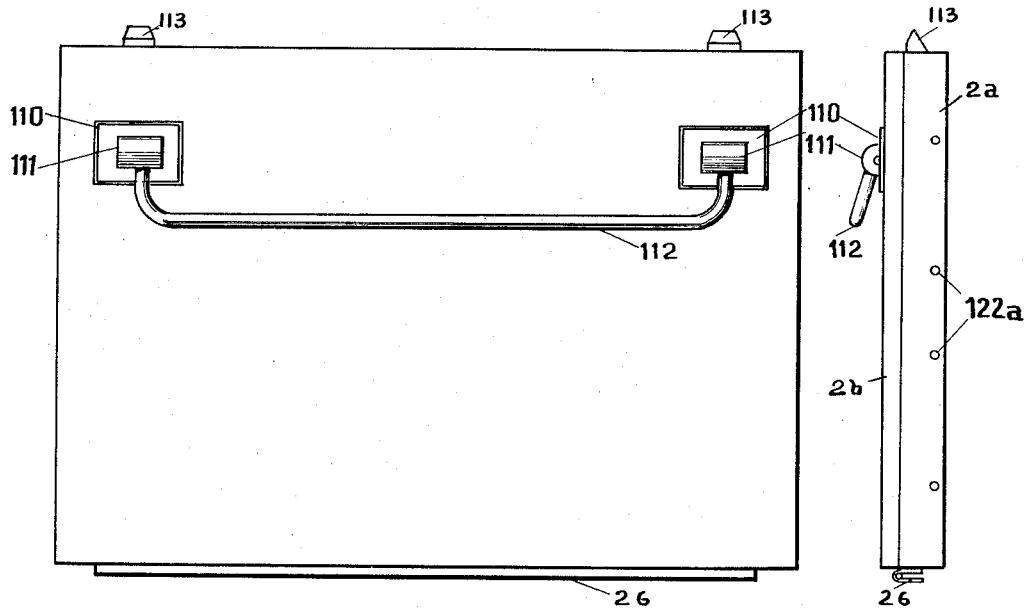
INVENTOR.
HENRY, ROBERT, GORDON.
BY
ATTORNEY.

Nov. 25, 1958 H. R. GORDON 2,862,096
ELECTRIC OVENS
Filed June 30, 1955 7 Sheets-Sheet 7
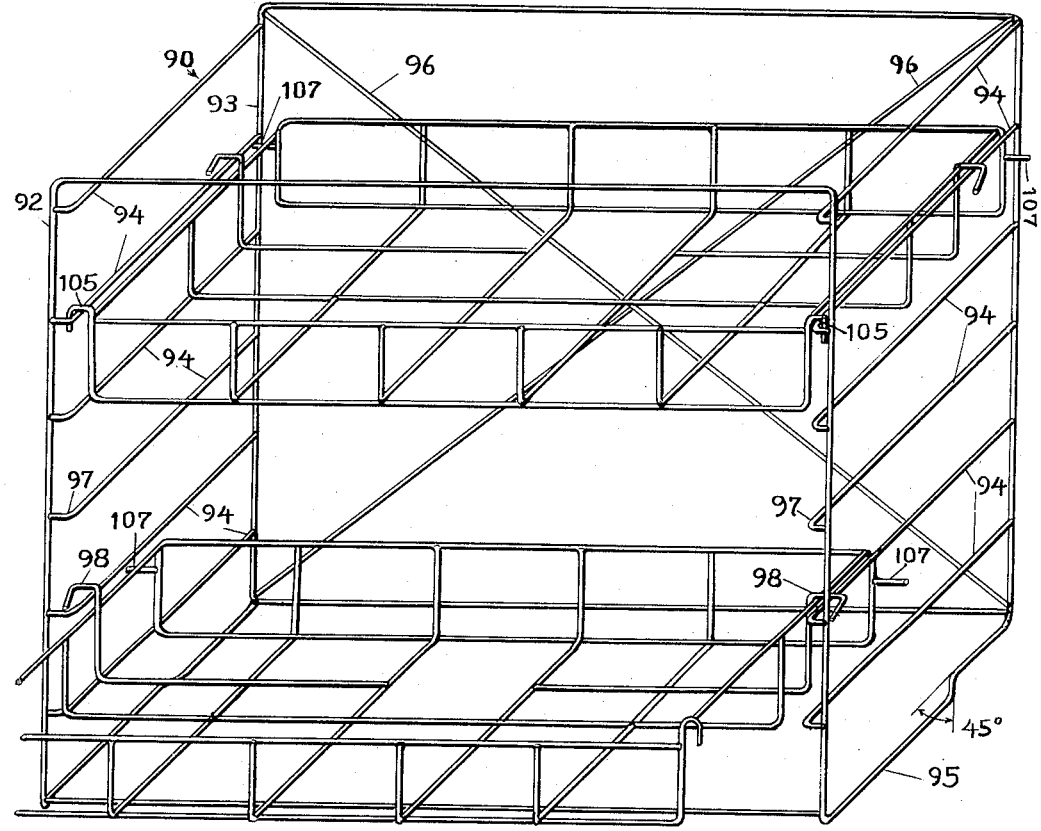
Fig_10_
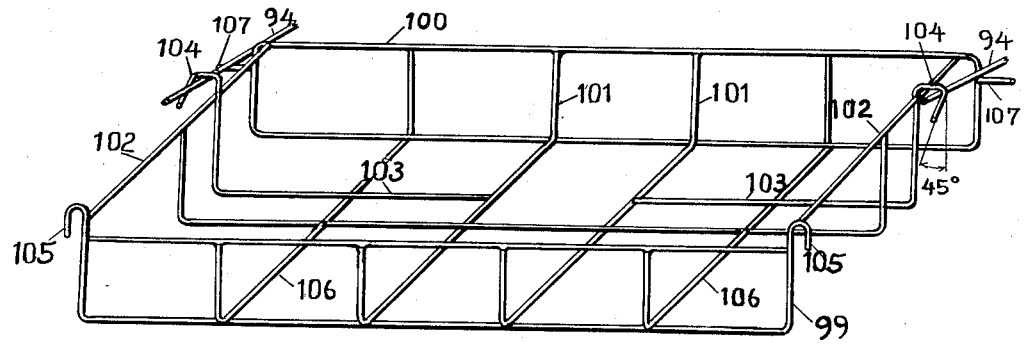
Fig_11_
INVENTOR.
HENRY ROBERT GORDON.
BY
ATTORNEY.

United States Patent Office 2,862,096
Patented Nov. 25, 1958

2,862,096

ELECTRIC OVENS

Henry R. Gordon, Williston Park, N. Y., assignor to Ref Manufacturing Corporation, a corporation of New York Application June 30, 1955, Serial No. 521,043

5 Claims. (Cl. 219—35)

This invention relates to improvements in electric ovens particularly of the type used in connection with the preparation of frozen or other foods on air or surface craft where safety, weight, convenience, space saving, and adaptation to all types of operating conditions are of the prime importance.

It is an object of the present invention to provide a very efficient, practical, economical and safe electric oven of the type wherein hot air from the heating unit located at the back of a baffle plate at the rear of the oven, is constantly circulated by a fan driven at high speed.

It is a further object of the present invention to provide an electric oven intended primarily to cook frozen foods, wherein the oven has an internal baffle containing the heating unit and an air-circulating motor for producing a forced draft characterized by unique timing, relay, indicating and deenergizing controls in electric circuits which also include the heater unit and air-circulating motor fan.

It is another object of the present invention to provide the oven with a novel food containing receptacle having safe but slidable racks to hold the food being cooked, which racks can be extended sufficiently from the receptacle to withdraw the food and yet be normally prevented from falling out of the receptacle.

A still further object of the present invention resides in eliminating food-trapping seams from the oven door, and inner body for sanitation; another object being the provision of positive locking and unlocking means between the oven body and its door.

Yet another object of the present invention is to provide locks for positive locking of the baffle assembly and the use of novel heating elements for the heating unit.

Various further and more specific objects, purposes, features and advantages will clearly appear from the detailed description given below taken in connection with the accompanying drawings which form a part of this specification and illustrate merely by way of examples certain embodiments of the device of the invention.

The invention consists in such novel features, arrangements and combinations of parts as may be shown and described in connection with the apparatus herein disclosed by way of example only and as illustrative of a preferred embodiment of the electric system and oven.

In the following description and in the claims, parts will be identified by specific names for convenience, but such names are intended to be as generic in their application to similar parts as the art will permit. Like reference characters denote like parts in the several figures of the drawings.

In the drawings:

Fig. 1 is a rear view blowup of an oven according to the invention;

Fig. 2 is a front view blowup of the same;

Fig. 3 is a schematic wiring diagram of the deenergization of the heater circuit and indicating means;

Fig. 4 is a plan view of the heater unit with baffle;

Fig. 5 is a detail sectional view taken through 5—5 of Fig. 4;

Fig. 5A is a detail of a female jack;

Fig. 6 is a detail sectional view taken through 6—6 of Fig. 4;

Fig. 9 is a front view of the oven door;

Fig. 9A is a top view of Fig. 9;

Fig. 9B is a side view of Fig. 9;

Fig. 10 is a perspective view of a tray receptacle utilized in the invention; and Fig. 11 is a perspective view of one of the trays.

Figure 7:
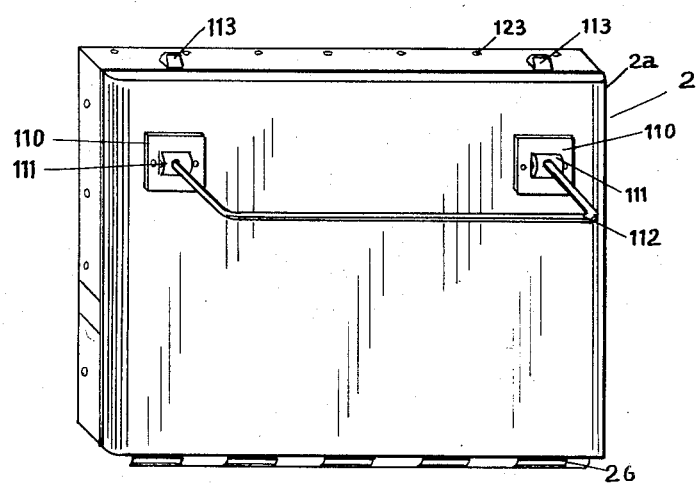
Fig. 7 is a perspective view of the oven door.

Referring now more particularly to the drawings, first with reference to Figs. 1 and 2, there is disclosed an oven particularly adapted for use in airplanes although the same may be used in other vehicles and environments where safety, weight and convenience is required and space is confined. The oven is preferably made of aluminum and stainless steel construction designed for service under substantially all types of operating conditions.

The oven is of the type which is so designed that hot air from the heating elements, located behind a baffle at the rear of the oven, is constantly circulated by a high speed motor driven fan, the latter being located at the rear of the heating element baffle. In such type oven, the distribution of the hot air over all of the surfaces of the oven interior is very even; the temperature being maintained by a thermostat. The oven is designed so that it prevents the drying out of foods being prepared; and is particularly adapted for the final preparation of reconstituted frozen meals, which are so cooked that when all of the components are brought together they require the same time for final cooking, the foods retaining their original flavor, consistency, and food value.

In its general aspect, the oven is provided with a housing 1 upon which is mounted an instrument panel box 1a, on the latter of which is placed a collar 3 having a cover 4. Motor 5 is mounted in receptacle 17 forming a part of a wall 17a. The numeral 18 indicates an "Amphenol" type fitting mounted on a bracket 18a fixed to wall 17a. Relay 13 is fixed to the instrument panel box 1a upon which is also mounted the thermostat 12, switches 10 and 14, timer 16, bell 11 and electric bulb 9. The bell 11 and light 9 are electrically connected with timer 16 and switch 10. A rear cover 6 is provided.

Plate 8 (Fig. 2) comprises an instrument panel. A fan 5 is fixed to the motor shaft 5a. Baffle plate 23 has the heating elements 24 preferably of the General Electric "Calrod" type mounted thereon. A door arm 26 is provided on door 2 and body or housing 1. Hinges 27 on housing 1 engage hinges 26 on door 2 through a hinge rod 25, to swingably connect door 2 to housing 1.

Fig. 3 is a schematic wiring diagram of the electric system. Receptacle or "Amphenol" fitting 18 connects with the source of power, terminal 18b through conductor 30 being grounded. Conductor 31 connects with one terminal 32a of switch 14, the other terminal 32b of the latter connecting through conductor 33 with terminal 34 of relay 13. Breaker or switch arm 35 of relay 13 leads from terminal 34 to terminal 36, from which the conductor 37 connects with terminal 38 of heater elements 24 and 24a, the terminals 39 of the latter being grounded through conductor 40. From terminal 39, conductor 41 leads to one terminal 42 of motor 5, the other terminal 43 of motor 5 through conductor 44 being connected to terminal 45 of switch 10. Terminal 46a connects through conductor 47 to terminal 18a of receptacle 18. The foregoing constitutes the motor and heater circuits.

The signal light circuit comprises the following. One terminal 9a of signal light 9 through conductor 48 connects with terminal 36 and the other terminal 9b through conductor 49 is grounded. One of the circuits for timer 16, which is normally closed, comprises conductor 50 connected to terminal 45 of switch 10 and terminals 16b and 16d of timer 16; conductor 51 connects terminal 52 of the bell 11 with terminal 16b of the timer, the bell 11 being internally grounded. The other circuit for timer 16 which is normally open comprises conductor 53 which connects terminal 16a of the timer to terminal 54 of relay 13; the other terminal 55 of relay 13 through conductor 56 connects with terminal 57 of thermostat 12. Thermostat 12 is grounded through conductor 59 which connects with terminal 58 of thermostat 12. Conductor 59a connects terminal 16c with terminal 45 of switch 10. Terminal or pole 46a of switch 10 and termial or pole 32a of switch 14 are connected through conductors 31 and 47 to terminal 18a of receptacle fitting 18.

Timer 16 is used to indicate the cooking time which is automatically connected to switch 10 and bell 11. The thermostat regulates the degree of heat within the oven and the timer determines the time during which the product is to remain in the oven under the influence of the heat. Switches 10 and 14 are manually operated.

Figs. 4, 5 and 6, show in detail the baffle assembly carrying the heater unit. This comprises the baffle plate 23, upon which are mounted four male jack assemblies 61a, 61b, 61c and 61d. Each jack assembly as shown in Fig. 5 may comprise an insulated base 62 fastened to plate 23 by means of rivet 63 having an insulating washer 64. Jack 65 which has a split head or bulb 65a and a contact shoulder 65b, is fastened to base 62 by a screw or lock washer 66, 67. Terminal lugs 68 connect heating elements 24, 24a with lugs 69 by means of screw, nut and washer assemblies 70. Each heating element is preferably a jacketed heating element of tubular design having a metal sheath or tube in which is sealed a helical resistance coil whose electrical characteristics can be utilized in the present oven design. One such heating element is sold under the trade-mark "Calrod." Fig. 6 is a sectional view of retainer means 71 for the "Calrods" 24, 24a. Each such means 71 is made of insulating material, preferably "Monobestos" which is a trade-mark, and is fastened to baffle plate 23 by means of rivet 72, an insulating plate 73 being interposed between plate 23 and retainer 71. A slot 74 is provided to retain the heating element or "Calrod" 24 or 24a.

Fig. 5A shows a detail of the female jack formed or fixed in the inner rear wall 1a of the oven assembly. When the four male jacks 65 are inserted into the female jacks 65c, the head or bulk 65a of each jack acts as a locking device to lock the baffle assembly in place, the shoulder 65b on the jack 65 providing a contact.

The female jacks are provided on the inner rear wall of the oven assembly and each has a recess 65d cut in the back end of the hole to receive the bulb or head 65a of the male jack for locking engagement therewith. Electric contacts are also thus established between the jacks and the electric system of the oven. The terminals 38, 39 in Fig. 3, represent the jack assemblies.

The functioning of the timer circuit is such that when the timer is in its normally closed position, the heater circuit is open, and the bell circuit is closed. In its normally open position the bell circuit is open while the heater circuit is closed and in operation. Therefore, when the timer is turned on, the oven heater circuit functions until the timer traverses its cycle, then the heater circuit is automatically turned off and the bell rings indicating the conclusion of the cycle.

Figures 8, 8A:
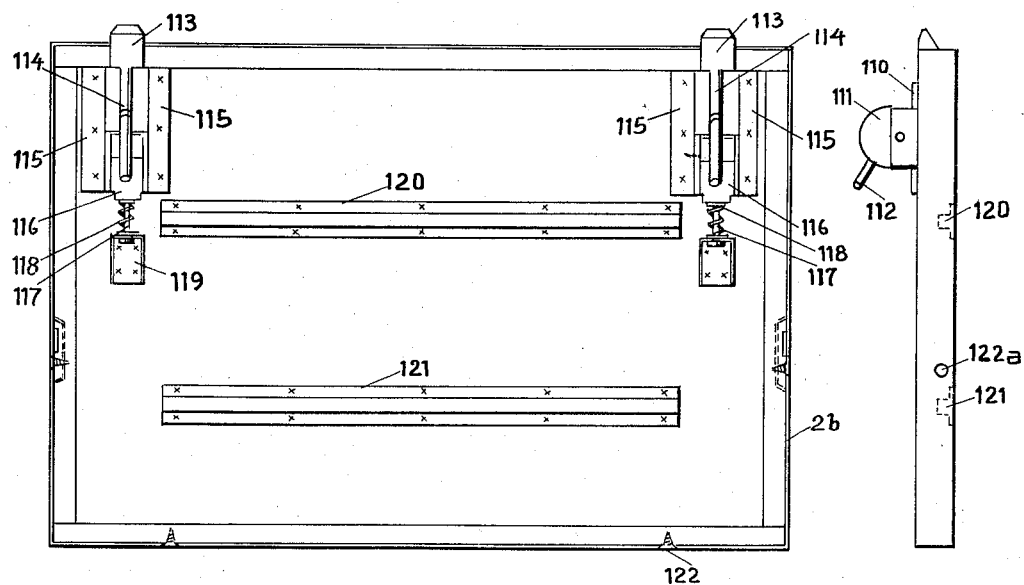
Fig. 8 is a detail view of Fig. 7.
Fig. 8A is a side view of Fig. 8.
Figure 8B:
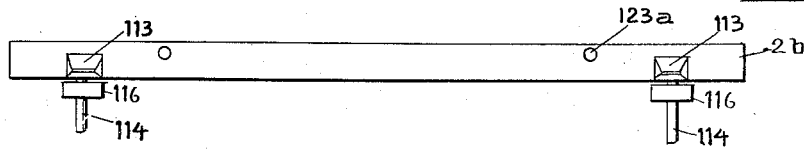
Fig. 8B is a top view of Fig. 8.

Figs. 7, 8, 9, 9a, and 9b illustrate the door and locking device assembly. The door 2 of the oven comprises an outer shell 2a and an inner shell 2b, the former having side flanges which overlap the sides of inner shell 2b so that there are no seams inwardly of the door in which food may accumulate.

Two spaced U-channels 120, 121 are welded to door 2 for stabilization thereof. The locking device comprises lugs 113 each mounted with a slide 116 sliding in channels 115. Each lug 113 is provided with a shank 114 connecting to the slide 116. Escutcheon plates 110 fixed to shell 2a provide for pivoted rollers 111 on which is mounted the handle 112. A bracket 119 is welded to plate 2a on which is mounted a shaft 117 connecting movable slide 116. A spring 118 is positioned between bracket 119 and slide 116 to slide the slide 116 in upward tension to maintain the lugs 113 in closed position. Screws 122 and screw holes 122a, 123, 123a are provided to fasten the outer shell 2a to the inner shell 2b. Hinges 26 are fastened to both the door and the housing or body of the oven.

The front door is so designed and constructed to operate safely with the least effort. By lifting the handle 112 with the least effort, the bolts or lugs 113 are retracted and disengaged from their corresponding sockets in the housing. When the door is closed, the lugs 113 lodge themselves within these sockets, by pressure on handle 112, and the springs 118.

The oven herein described is of practical utility as well as safe in operation.

Figs. 10 and 11 show the oven tray receptacle and trays generally indicated respectively by the numerals 90 and 91. The receptacle and trays are constructed of metal rods welded together at their joints. Receptacle 90 is formed to fit within the oven. It comprises a front frame 92, a rear frame 93, tray rest members 94, and side members 95. The front frame member 92 is wider in width than the rear frame member 93 by means of crimping the side frame members 95 with a forty-five degree angle inwardly, bending the tray rests 94, ninety degrees outwardly (as indicated at 97), and fastening to the front and rear frame members 92 and 93. This enables the tray to move freely and to be easily removed. For stability, the receptacle members 96 are crosswise welded to the rear frame 93.

The trays 91 are substantially identical, in Fig. 10, one being shown completely inserted and the other partly withdrawn to a stop 98.

Fig. 11 shows the construction of the tray and comprises a front frame member 99 and a rear frame member 100 which are joined together by the side members 101 and 102. Members 103, which are fastened to members 101 and 102, are provided with hooks 104 which bend outwardly and downwardly one hundred and eighty degrees with a forty-five degree angle forwardly. The hook 104 rests in the receptacle 90 on bars 94, these hooks also functioning as stops 98 by resting against the front frame 92. Hooks 105 on front frame member 99 rest on the bars 94 when the tray is completely inserted in the receptacle. Connecting members 106 stabilize the tray. Studs 107 are welded to the rear frame 100 to prevent the tray from tilting or sliding out of the receptacle by resting on the lower side of bars 94. Studs 107 ride on bars 94. The tray may easily be taken out of the receptacle by lifting the same.

While the invention has been described and illustrated with respect to certain particular preferred examples which give satisfactory results, it will be understood by those skilled in the art after understanding the principle of the invention, that various changes and modifications may be made without departing from the spirit and scope of the invention and it is intended therefore in the appended claims to cover all such changes and modifications.

What is claimed is:

1. An electric oven adapted for the preparation of foods comprising a receptacle, a heating unit, a timer, air-circulating means in said oven for producing a forced draft in said receptacle, an electric system including a timer circuit for said timer and a heater circuit for said heating unit, said circuits being operable such that during the operation of said timer said heater circuit will continue to be energized and upon completion of said operation of said timer said heating circuit will automatically become de-energized, said heating unit and heater circuit having means cooperable to releasably mount said heating unit in said heater circuit in vertical disposition between said air-circulating means and said receptacle to define a heater receptacle therein, said heater unit including a baffle plate having an opening defined therein to permit said forced draft to be produced centrally in said receptacle, said cooperable means including a plurality of jack assemblies wherein said receptacle is provided with sockets therein lockingly receiving said jacks to connect the same in said electric system, each of said assemblies having a base insulatedly fixed to said plate, a jack fixed to said base and a heating element having lugs connected to two of said jack assemblies, said heating element comprising a tubular metal jacket and a helical resistance coil enclosed therein, and retainer means for said heating element, said retainer means including an insulating block secured to said baffle plate intermediate said two jack assemblies, said block having a slot receiving and engaging portion of said heating element.

2. An electric oven adapted for the preparation of foods comprising a receptacle, a heating unit, a timer, air-circulating means in said oven for producing a forced draft in said receptacle, an electric system having a timer circuit for said timer and a heater circuit for said heating unit, said circuits being operable in such manner that during the operation of said timer said heater circuit will be energized and upon completion of said operation of said timer said heater circuit will automatically become de-energized, said heater unit and heater circuit having means cooperable to releasably mount said heating unit in said heater circuit in vertical disposition between said air-circulating means and said receptacle to define a heater receptacle therein, said heating unit including a baffle plate, an opening defined in said baffle plate to permit said forced draft to be produced centrally in said receptacle, said cooperable means including at least one pair of jacks insulatedly mounted on said plate and cooperable sockets in said receptacle forming a part of said heater circuit to releasably receive the jacks therein to connect the same with said heater circuit and said electrical system, a heating element connected to said jacks, said heating element having a metal sheath and a helical resistance member housed therein and retainer means for said heating element, said retainer means comprising an insulating block secured to said baffle plate intermediate said jacks and engaging a portion of said heating element.

3. An electric oven adapted for the preparation of foods comprising a receptacle, a heating unit, a timer, air-circulating means in said oven for producing a forced draft in said receptacle, an electric system including a timer circuit for said timer and a heater circuit for said heating unit, said circuits being operable such that during an operation of said timer said heater circuit will continue to be energized and upon completion of said operation of said timer said heating circuit will automatically become de-energized, said heating unit and heater circuit having means cooperable to releasably mount said heating unit in said heater circuit in vertical disposition between said air-circulating means and said receptacle to define a heater receptacle therein, said heating unit including a baffle plate having an opening defined therein to permit said forced draft to be produced centrally in said receptacle, said cooperable means including at least one pair of jacks insulatedly mounted on said plate, a heating element connected to said jacks and wherein said receptacle is provided therein with means to releasably receive said jacks to connect the same in said heater circuit of said electric system.

4. An oven comprising, in combination, an oven compartment, a door movable between a position forming a shelf for said compartment and a compartment closing position, an electrical system including a heating circuit having receptacles to releasably receive cooperating jacks to connect the same into said electrical system, a timer, a timer circuit for said timer, said circuits cooperating during the operation of said timer so that said heater circuit wil be energized and upon completion of said timer operation said heater circuit will de-energize, a fan in said timer circuit operable during the operation of said oven, and a vertically disposed heater unit having jack means and heating elements connected to said jack means, said jack means being insulatedly mounted on said heater unit for manual placement into cooperation with said receptacles for releasable receipt therein to engage said heater unit bodily in said heater circuit intermediate said fan and compartment and to disengage the same from said heater circuit at will.

5. An oven comprising an oven compartment, a door movable to open and close said compartment, air circulating means in said compartment at the rear thereof, heater means vertically disposed between said air circulating means and said compartment at the rear thereof and having an opening defined therein through which said air circulating means produces a movement of air to heat the same as it passes over said heater means, at least one pair of jacks insulatedly mounted on said heater means, a heater element connected between said jacks, an electrical system including a heater circuit for said heater element and means to receive said jacks to connect the same into the system, a timer circuit including operative timer means to time the operation of said heater element, and relay means connecting said heater circuit with said timer circuit to automatically end the operation of said heater element upon the completion of the timing operation of said timer means.

References Cited in the file of this patent

UNITED STATES PATENTS

| | | |
|---|---|---|
| 1,974,983 | Cook | Sept. 25, 1934 |
| 2,008,091 | Betts | July 16, 1935 |
| 2,108,359 | Accardi | Feb. 15, 1938 |
| 2,161,912 | Cossin | June 13, 1939 |
| 2,302,625 | Gallagher | Nov. 17, 1942 |
| 2,408,331 | Mills | Sept. 24, 1946 |
| 2,410,285 | Herbster | Oct. 29, 1946 |
| 2,466,360 | Bitney | Apr. 5, 1949 |
| 2,490,076 | Maxson | Dec. 6, 1949 |
| 2,491,420 | Scott | Dec. 13, 1949 |
| 2,498,583 | Schulze | Feb. 21, 1950 |
| 2,499,525 | Person | Mar. 7, 1950 |
| 2,515,427 | Schulze | July 18, 1950 |
| 2,523,796 | Weeks | Sept. 26, 1950 |
| 2,591,849 | McDowell | Apr. 8, 1952 |
| 2,701,294 | Herbert | Feb. 1, 1955 |
| 2,732,235 | Schemers | Jan. 24, 1956 |